(12) United States Patent
Son

(10) Patent No.: US 8,848,598 B2
(45) Date of Patent: Sep. 30, 2014

(54) METHOD OF ANALYZING INTERFERENCE BETWEEN DATA COMMUNICATION TERMINALS

(75) Inventor: Ho Kyung Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 410 days.

(21) Appl. No.: 13/334,133

(22) Filed: Dec. 22, 2011

(65) Prior Publication Data

US 2012/0163195 A1    Jun. 28, 2012

(30) Foreign Application Priority Data

Dec. 23, 2010   (KR) .................. 10-2010-0133527

(51) Int. Cl.
*H04B 7/185* (2006.01)
*H04L 1/20* (2006.01)
*H04L 1/00* (2006.01)
*H04W 28/04* (2009.01)
*H04B 17/00* (2006.01)

(52) U.S. Cl.
CPC ............ *H04W 28/048* (2013.01); *H04W 28/04* (2013.01); *H04B 17/00* (2013.01); *H04L 1/20* (2013.01); *H04L 1/0001* (2013.01); *Y02B 60/50* (2013.01)
USPC ........ 370/317; 370/310; 455/67.13; 455/436; 455/445; 455/446; 455/447; 455/450; 455/561

(58) Field of Classification Search
None
See application file for complete search history.

(56) References Cited

U.S. PATENT DOCUMENTS 6,711,404 B1 *   3/2004   Arpee et al. ............. 455/423

FOREIGN PATENT DOCUMENTS

KR   10-2004-0085942 A   10/2004
KR   10-2008-0051038 A    6/2008

OTHER PUBLICATIONS

Young-Hwan Kim et al., "Monte-Carlo Based Interference Analysis of 900MHz Passive RFID Systems", IEEK Journal, vol. 43, TC, No. 1, pp. 9-18, Jan. 2006.

* cited by examiner

*Primary Examiner* — Faruk Hamza
*Assistant Examiner* — Aixa A Guadalupe-Cruz
(74) *Attorney, Agent, or Firm* — Rabin & Berdo, P.C.

(57) ABSTRACT

A method may include distributing a interfered terminal; calculating an initial signal-to-interference power ratio and a data throughput of the interfered terminal; distributing interfering terminals and an interfering link base station; calculating a final transmitting power of the interfering terminal through power control between the interfering terminal and the interfering link base station; calculating a path loss and a collision factor between the interfered terminal and the interfering terminal; and calculating a final signal-to-interference power ratio and a data throughput of the interfered terminal. Accordingly, it is possible to analyze interference in consideration of a terminal use pattern in view of presence of hot spots, and to provide basic data for setting an effective emission transmitting power level of the terminal and a protection band between the terminals since the signal-to-interference power ratio and the data throughput can be calculated through interference analysis.

6 Claims, 4 Drawing Sheets

METHOD OF ANALYZING INTERFERENCE BETWEEN DATA COMMUNICATION TERMINALS

CLAIM FOR PRIORITY

This application claims priority to Korean Patent Application No. 10-2010-0133527 filed on Dec. 23, 2010 in the Korean Intellectual Property Office (KIPO), the entire contents of which are hereby incorporated by reference.

BACKGROUND

1. Technical Field

Example embodiments of the present invention relate in general to a method of analyzing interference between data communication terminals and more specifically to a method of analyzing interference occurring between terminals having different schemes or different business terminals when the terminals use adjacent frequencies.

2. Related Art

Schemes mainly used for analysis of interference between wireless communication systems include a minimum coupling loss (MCL) scheme, a Monte-Carlo scheme, and the like.

First, in the MCL scheme, a minimum distance, i.e., a separation distance or a separation frequency by which a number of systems must be separated to operate without interference between the systems is calculated through a system parameter and a propagation model. An activity factor of a transceiver is neglected and the worst case in which a signal having a certain size is continuously received is assumed. Accordingly, a great separation distance or separation frequency (protection band) not suitable for actual application is calculated.

However, since real systems are normally operated with a much smaller minimum frequency or distance separation compared to results obtained using the MCL scheme, it has been discussed whether the worst result obtained through the MCL scheme is appropriate.

On the other hand, in the Monte-Carlo scheme, all parameter values related to an interference environment are designated and interference probability is statistically calculated. This Monte-Carlo scheme is somewhat complex and has an error in interference probability according to an input parameter value, but has an advantage in that the Monte-Carlo scheme can simulate all interference environments.

FIG. 1 is a conceptual diagram illustrating a situation in which interference between general wireless communication systems occurs.

Referring to FIG. 1, an antenna system that is a target of interference analysis is assumed to be an interfered antenna system 10, and an antenna system causing interference in the interfered antenna system 10 is assumed to be an interfering antenna system 20.

In this case, the interfered antenna system 10 includes an interfered receiver 11 and a party transmitter 12, and the interfering antenna system 20 includes an interfering transmitter 21 and a target receiver 22.

In addition, a strength of a signal that the interfered receiver 11 receives from the party transmitter 12 is defined as a desired receiving signal strength (DRSS), and a strength of a signal that the interfered receiver 11 receives from the interfering transmitter 21 is defined as an interfering receiving signal strength (IRSS). In this case, the signal that the interfered receiver 11 receives from the interfering transmitter 21 causes interference with the interfered receiver 11.

Further, a link established between the interfered receiver 11 and the party transmitter 12 is defined as an interfered link 13, and a link established between interfered receiver 11 and the interfering transmitter 21 is defined as an interfering link 23.

Hereinafter, a method of calculating interference probability of an antenna system using a conventional Monte-Carlo scheme will be described in detail.

First, a parameter corresponding to each of the interfered receiver 11, the interfering transmitter 21, the party transmitter 12, and the target receiver 22 is set. In addition, a parameter of the link between the interfered receiver 11 and the party transmitter 12 and a parameter of the link between the interfering transmitter 21 and the target receiver 22 are also set.

Then, the strength (DRSS) of the signal that the interfered receiver 11 receives from the party transmitter 12 and the strength (IRSS) of the signal that the interfered receiver 11 receives from the interfering transmitter 21 are calculated.

In this case, the strength (DRSS) of the signal that the interfered receiver 11 receives from the party transmitter 12 is expressed as in Equation 1.

$$DRSS = p_{wtsupplied} + g_{wt \to vr} - pl_{wt \to vr}(f_{vr}) + g_{vr \to wt} \quad \text{[Equation 1]}$$

where $p_{wtsupplied}$ denotes a power supplied to the party transmitter 12, $g_{wt \to vr}$ denotes an antenna gain directed from the party transmitter 12 to the interfered receiver 11, $g_{vr \to wt}$ denotes an antenna gain directed from the interfered receiver 11 to the party transmitter 12, and $pl_{wt \to vr}(f_{vr})$ denotes a path loss for a path between the party transmitter 12 and the interfered receiver 11.

In general, interference mechanisms are largely classified into blocking, unwanted emission, and intermod, and IRSS according to the respective interference mechanisms may be expressed as in Equations 2 to 4.

$$IRSS_{block,i} = (p_{itsupplied} + g_{itPC} + g_{it \to vr} - pl_{it \to vr} - a_{vr} + g_{vr \to it}) \quad \text{[Equation 2]}$$

where $IRSS_{block,I}$ denotes a strength of a blocking interfering receiving signal received from an i-th interfering transmitter 21, $p_{it\ supplied}$ denotes a power supplied to the interfering transmitter 21, $g_{itPC}$ denotes a power control gain for the interfering transmitter 21 in a power control function, $g_{it \to vr}$ denotes an antenna gain directed from the interfering transmitter 21 to the interfered receiver 11, $g_{vr \to it}$ denotes an antenna gain directed from the interfered receiver 11 to the interfering transmitter 21, $a_{vr}$ denotes blocking attenuation of the interfered receiver 11, and $pl_{it \to vr}$ denotes a path loss for a path between the interfering transmitter 21 and the interfered receiver 11.

$$IRSS_{unwanted\_i} = (\text{emission}_{it}(f_{it}, f_{vr}) + g_{it \to vr} - pl_{it \to vr}(f_{vr}) + g_{vr \to it}) \quad \text{[Equation 3]}$$

where $IRSS_{unwanted\_i}$ denotes a strength of an interference signal received by the interfered receiver 11 from unwanted emission of the i-th interfering transmitter 21.

Further, $\text{emission}_{it}(f_{it}, f_{vr})$ denotes a strength of an interference signal received in a receiving bandwidth of the interfered receiver 11. The $\text{emission}_{it}(f_{it}, f_{vr})$ may be obtained as a function of a generally known unwanted emission mask, a transmitting power strength of the interfering transmitter 21, and the like.

$$I_{i,j}RSS_{intermod} = 2 * I_iRSS_{int} + I_jRSS_{int} - 3 \text{ intermod} - 3 \text{ sens}_{vr} - 9dB \quad \text{[Equation 4]}$$

where $I_{i,j}RSS_{intermod}$ denotes a strength of an intermod interfering receiving signal received from an i-th interfering transmitter and a j-th interfering transmitter, intermod denotes a $3^{rd}$ intermod attenuation, and $\text{sens}_{vr}$ denotes sensitivity of the interfered receiver.

Accordingly, the interference probability P may be calculated as probability of DRSS/IRSS being equal to or less than a carrier-to-interference ratio (C/I) required in the system under the condition that a DRSS is above a reception sensitivity level.

That is, if a specific parameter among input parameters is input as a range instead of a fixed value, the DRSS and the IRSS are calculated by applying each value in the range and then the number of times DRSS/IRSS does not exceed a threshold (C/I) is divided by a total number of times to obtain interference probability.

This may be expressed as in Equation 5.

$$P = P\left\{\frac{DRSS}{IRSS} < \frac{C}{I} \,\bigg|\, DRSS > sens\right\} \qquad \text{[Equation 5]}$$

This conventional method of calculating interference probability of a wireless communication system using a Monte-Carlo scheme has an advantage in that the method can calculate the interference probability reflecting a real environment. On the other hand, in analysis of interference between data communication terminals, the MCL scheme derives an unreal interference result in consideration of the worst case, and may have a problem in satisfying a necessary protection band or separation distance.

However, there is a problem even when the Monte-Carlo scheme is applied for analysis of interference between terminals, which is that, in the Monte-Carlo scheme, terminals are assumed to be randomly distributed with uniform probability within a radius of a cell.

FIG. 2 is a conceptual diagram illustrating a terminal distribution for analysis of interference between general terminals using a Monte-Carlo scheme.

Referring to FIG. 2, when the Monte-Carlo scheme is applied for analysis of interference between terminals, a situation in which interfered terminals 211 to 216 and interfering terminals 221 to 225 are randomly distributed with uniform probability around a interfered link base station 201 in a radius of one cell 200 is assumed. Accordingly, the interfering terminals are less likely to be distributed near the interfered terminals and analysis of interference between the terminals shows that interference hardly occurs, limiting application of the Monte-Carlo scheme. That is, randomly distributing the terminals within the radius of the cell by applying the Monte-Carlo scheme does not reflect a real terminal use pattern.

For example, in view of a recent hot spot or zone concept, terminals are mainly used in a specific region having a small radius such as an office, coffee shop, subway, or bus. A terminal use pattern in which such specific regions are randomly distributed within a radius of a cell is observed. Accordingly, it is necessary to enhance interference analysis using the Monte-Carlo scheme in consideration of a current terminal use pattern and a cell design scheme.

SUMMARY

Accordingly, example embodiments of the present invention are provided to substantially obviate one or more problems due to limitations and disadvantages of the related art.

Example embodiments of the present invention provide a method of analyzing interference between data terminals in consideration of a terminal use pattern in which specific regions (e.g., hot spots or hot zones) each having a small radius, such as an office, coffee shop, subway or bus where terminals are mainly used, are randomly distributed within a radius of a cell in view of presence of the specific regions.

In some example embodiments, a method of analyzing interference between data communication terminals includes: distributing a interfered terminal suffering from interference; calculating an initial signal-to-interference power ratio and a data throughput of the interfered terminal; distributing interfering terminals and an interfering link base station; calculating a final transmitting power of the interfering terminal through power control between the interfering terminal and the interfering link base station; calculating a path loss and a collision factor between the interfered terminal and the interfering terminal; and calculating a final signal-to-interference power ratio and a data throughput of the interfered terminal.

Here, the distributing of the interfered terminal suffering from interference may include randomly distributing the interfered terminal suffering from interference around a interfered link base station within a radius of a cell of the interfered link base station.

Here, the distributing of the interfering terminals and the interfering link base station may include randomly distributing a predetermined number of interfering terminals around the interfered terminal within a radius of a hot-spot cell, and distributing the interfering link base station according to a condition of an input parameter.

Here, the calculating of the path loss and the collision factor between the interfered terminal and the interfering terminal may include calculating the collision factor using the following equation:

$$G_{collision} = 10\log_{10}\left(\frac{T_{collision}}{T_{vic}}\right)$$

where $T_{vic}$ denotes a packet period of the interfered terminal, and $T_{collision}$ denotes a time when a packet of the interfered terminal collides with a packet of the interfering terminal.

Here, the calculating of the final signal-to-interference power ratio and the data throughput of the interfered terminal may include calculating the signal-to-interference power ratio using the following equation:

$$\frac{G}{I} = \frac{P_{r\_user}}{N_0 + I_{inter} + I_{other}}$$

where $P_{r\_user}$ denotes a size of a signal that the interfered terminal receives from the base station, $N_0$ denotes thermal noise of the terminal, $I_{inter}$ denotes a size of an interference signal by the same sub-band user in an adjacent cell, and $I_{other}$ denotes a size of an interference signal received from the other system.

$I_{other}$ may be calculated using the following equation:

$$I_{other} = P_{tx}(f_{interfer}, f_{vr}) - PL_{t\_t} - G_{collision}$$

where $P_{tx}(f_{interfer}, f_{vr})$ denotes a size of a signal actually transmitted in a receiving bandwidth of the interfered terminal in a mask of a transmitting signal that the interfering terminal transmits after performing power control, $PL_{t\_t}$ denotes the path loss value calculated in a unit configured to calculate a path loss between the interfered terminal and the interfering terminal, and $G_{collision}$ denotes the collision factor between the interfered terminal and the interfering terminal calculated in a unit configured to calculate a collision factor between the interfered terminal and the interfering terminal.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
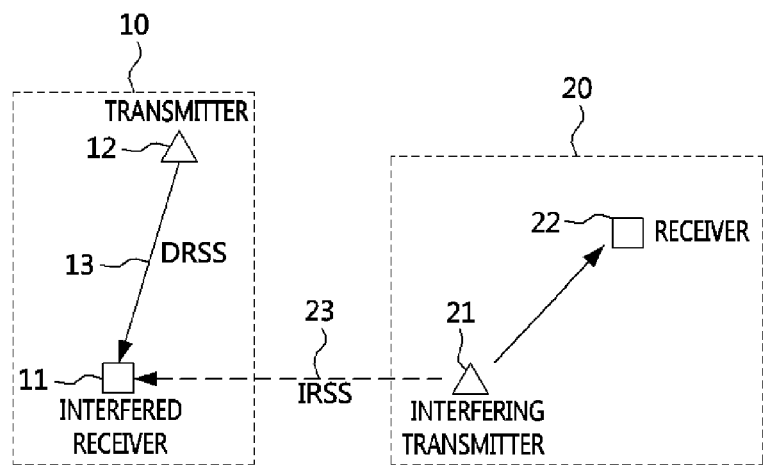
FIG. 1 is a conceptual diagram illustrating a situation in which interference between general wireless communication systems occurs.
Figure 2:
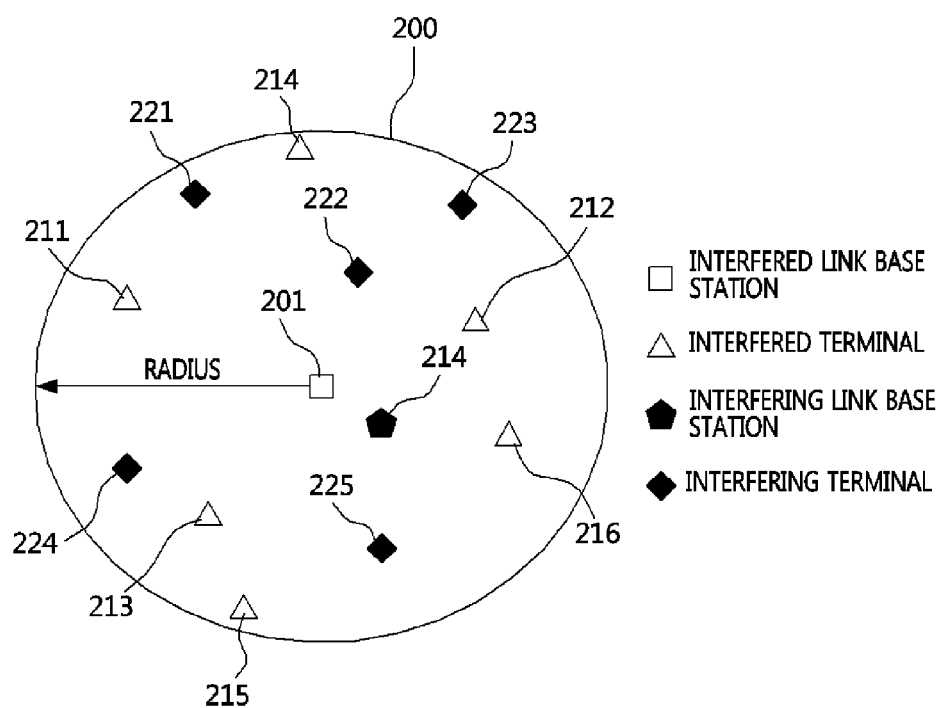
FIG. 2 is a conceptual diagram illustrating a terminal distribution for analysis of interference between general terminals using a Monte-Carlo scheme.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a concept of a distribution of terminals, which is a premise of the method of analyzing interference according to an example embodiment of the present invention, will be described before the method of analyzing interference according to the example embodiment of the present invention is described.

Figure 3:
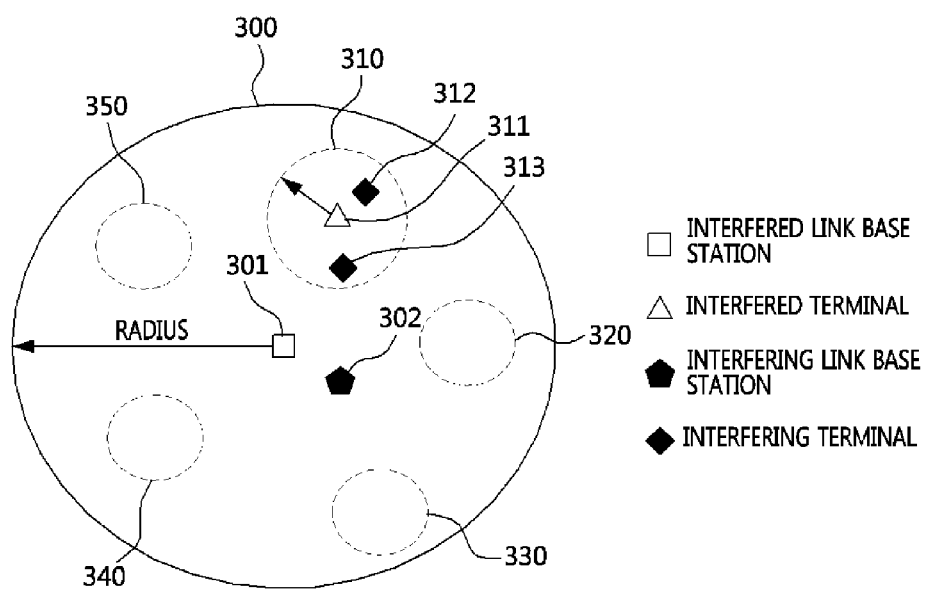
FIG. 3 is a conceptual diagram illustrating a concept of a distribution of a interfered terminal and interfering terminals in a method of analyzing interference between data communication terminals according to an example embodiment of the present invention.

FIG. 3 is a conceptual diagram illustrating a concept of a distribution of a interfered terminal and interfering terminals in a method of analyzing interference between data communication terminals according to an example embodiment of the present invention.

Referring to FIG. 3, terminals are mainly used in specific regions 310, 320, 330, 340 and 350 each having a small radius, such as an office, coffee shop, subway or bus, and the specific regions (e.g., hot spots) are randomly distributed around a interfered link base station 301 within a radius of one cell 300.

Accordingly, in the method of analyzing interference according to the example embodiment of the present invention, interfering terminals 312 and 313 are distributed around a interfered terminal 311 suffering from interference in order to reflect such a terminal use pattern in analysis of interference between terminals. That is, when it is assumed that terminals are randomly distributed with uniform probability within the radius of the cell, as in a conventional analysis method, terminals are less likely to be distributed near a terminal suffering from interference and analysis of interference between the terminals shows that interference hardly occurs, limiting application of the conventional analysis method. Accordingly, in view of a recent concept of a hot spot or a hot zone, a situation in which terminals are concentrated in a specific region having a small radius is considered in example embodiments of the present invention.

Figure 4:
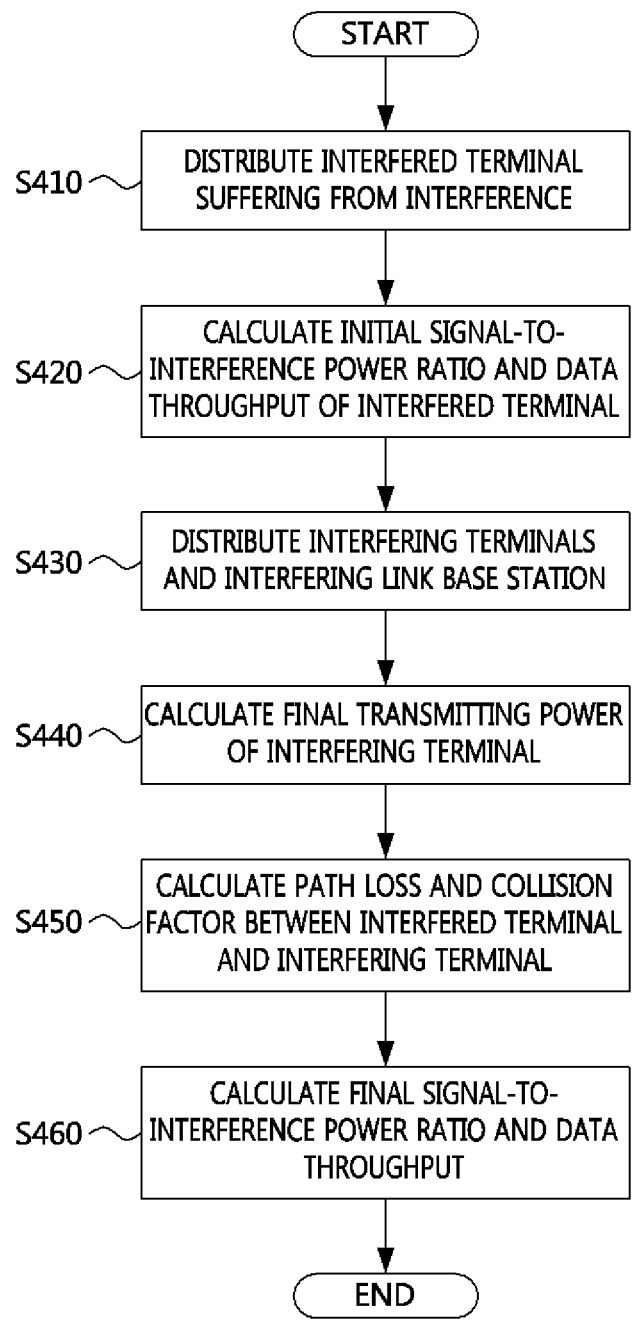
FIG. 4 is a flowchart illustrating a method of analyzing interference between data communication terminals according to an example embodiment of the present invention.

FIG. 4 is a flowchart illustrating a method of analyzing interference between data communication terminals according to an example embodiment of the present invention.

Referring to FIG. 4, the method of analyzing interference according to an example embodiment of the present invention may include step S410 of distributing a interfered terminal suffering from interference, step S420 of calculating an initial signal-to-interference power ratio and a data throughput, step S430 of distributing interfering terminals and an interfering link base station, step S440 of calculating a final transmitting power of the interfering terminal through power control between the interfering terminal and the interfering link base station, step S450 of calculating a path loss and a collision factor between the interfered terminal and the interfering terminal, and step S460 of calculating a final signal-to-interference power ratio and a data throughput.

First, step S410 of distributing a interfered terminal suffering from interference and step S430 of distributing interfering terminals and an interfering link base station will be described with reference to the concept of the distribution of the interfered terminal and the interfering terminal according to the example embodiment of the present invention described above with reference to FIG. 3.

That is, in step S410 of distributing a interfered terminal suffering from interference, the interfered terminal 311 suffering from interference is randomly distributed around the interfered link base station 301 within the radius of the cell 300.

Next, in step S420 of distributing interfering terminals and an interfering link base station, a defined number of interfering terminals 312 and 313 are randomly distributed around the interfered terminal 311 distributed in step S410 within the radius of the hot spot. Last, an interfering link base station 302 is distributed according to a condition of an input parameter.

Meanwhile, for convenience of explanation, step S430 has been first described prior to step S420, but step S420 is performed after step S410 is performed, that is, after the interfered terminal is distributed and before the interfering terminals are distributed.

That is, in step S420 of calculating an initial signal-to-interference power ratio and a data throughput, the initial signal-to-interference power ratio and the data throughput of the interfered terminal are calculated. In this case, the signal-to-interference power ratio may be expressed as in Equation 6.

$$\frac{G}{I} = \frac{P_{r\_user}}{N_0 + I_{inter} + I_{other}} \quad \text{[Equation 6]}$$

where $P_{r\_user}$ denotes a size of a signal that a user receives from the base station, $N_0$ denotes thermal noise of the terminal, $I_{inter}$ denotes a size of an interference signal by the same sub-band user in an adjacent cell, and $I_{other}$ denotes a size of an interference signal received from the other system. $I_{inter}$ denotes a value applied only when there is a user using the same band in an adjacent cell. That is, the $I_{other}$ value is a value not considered in a process of obtaining the initial signal-to-interference power ratio, and may be used only in a process of obtaining a final signal-to-interference power ratio.

Meanwhile, a data throughput of each terminal may be obtained by referencing link level data provided in the system using the calculated signal-to-interference power ratio.

Next, in step S440 of calculating a final transmitting power of the interfering terminal through power control between the interfering terminal and the interfering link base station, power control is performed by applying a power control algorithm provided in the terminal system on the assumption that the terminals are distributed as done in steps S410 and S430. After the power control algorithm is applied to each distributed terminal, a transmitting power of the interfering terminal is calculated as a final transmitting power.

In step S450, a path loss and a collision factor between the interfered terminal and the interfering terminal are calculated.

The path loss may be calculated by applying various path loss models based on positions of the interfered terminal and the interfering terminals shown in FIG. 3 and other parameters. Calculation of the collision factor between the interfered terminal and the interfering terminal may be described using a concept illustrated in FIG. 5 as follows.

Figure 5:
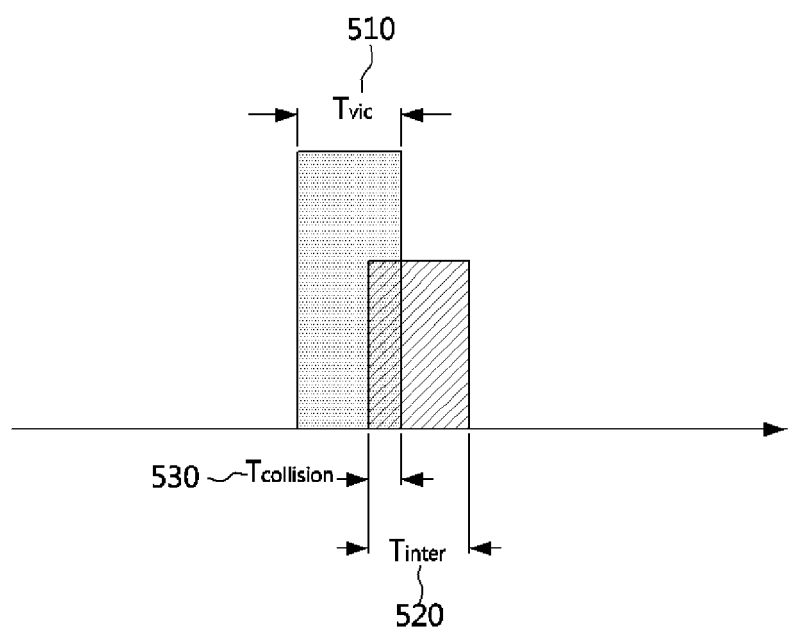
FIG. 5 is a conceptual diagram illustrating calculation of a collision factor in the method of analyzing interference between data communication terminals according to an example embodiment of the present invention.

FIG. 5 is a conceptual diagram illustrating calculation of the collision factor in the method of analyzing interference between data communication terminals according to an example embodiment of the present invention.

Referring to FIG. 5, $T_{vic}$ denotes a packet period of the interfered terminal, and $T_{inter}$ denotes a packet period of the interfering terminal. $T_{collision}$ denotes a time when a packet of the interfered terminal collides with a packet of the interfering terminal.

In this case, the collision factor between the interfered terminal and the interfering terminal may be obtained using Equation 7 based on the above-described elements.

$$G_{collision} = 10\log_{10}\left(\frac{T_{collision}}{T_{vic}}\right) \quad \text{[Equation 7]}$$

Last, in step S460 of calculating a final signal-to-interference power ratio and a data throughput, a signal-to-interference power ratio and a data throughput of the interfered terminal are calculated after the steps are performed. The final signal-to-interference power ratio may be calculated using Equation 6, and $I_{other}$ may be defined as in Equation 8.

$$I_{other} = P_{tx}(f_{interfer}, f_{vr}) - PL_{t\_i} - G_{collision} \quad \text{[Equation 8]}$$

where $P_{tx}(f_{interfer}, f_{vr})$ denotes a size of a signal actually transmitted in a receiving bandwidth of the interfered terminal in a mask of a transmitting signal that the interfering terminal transmits after performing power control. $PL_{t\_i}$ and $G_{collision}$ denote the path loss value and the collision factor between the interfered terminal and the interfering terminal, which are calculated in step S450 of calculating a path loss and a collision factor between the interfered terminal and the interfering terminal, respectively.

After the steps are performed, the signal-to-interference power ratio and the data throughput of the interfered terminal are finally calculated in step S460. The signal-to-interference power ratio and the data throughput may be used to determine criteria of a to protection band between terminals and a transmitting power level for interference avoidance.

With the method of analyzing interference according to the example embodiments of the present invention as described above, it is possible to analyze interference between data terminals in consideration of a terminal use pattern in which specific regions (e.g., hot spots or hot zones) each having a small radius, such as office, coffee shop, subways or bus where terminals are mainly used, are randomly distributed within a radius of a cell in view of presence of the specific regions.

With the method of analyzing interference between terminals according to an example embodiment of the present invention, the signal-to-interference power ratio and the data throughput of the interfered terminal can be calculated through analysis of interference between data communication terminals. Accordingly, the signal-to-interference power ratio and the data throughput can be used as basic data for setting an effective emission transmitting power level of the terminal and a protection band between the terminals to suppress interference.

While the example embodiments of the present invention and their advantages have been described in detail, it should be understood that various changes, substitutions and alterations may be made herein without departing from the scope of the invention.

What is claimed is:

1. A method of analyzing interference between data communication terminals, the method comprising:
    distributing an interfered terminal suffering from interference;
    calculating an initial signal-to-interference power ratio and a data throughput of the interfered terminal;
    distributing interfering terminals and an interfering link base station;
    calculating a final transmitting power of the interfering terminal through power control between the interfering terminal and the interfering link base station;
    calculating a path loss and a collision factor between the interfered terminal and the interfering terminal; and
    calculating a final signal-to-interference power ratio and a data throughput of the interfered terminal;
    wherein the distributing of the interfered terminal suffering from interference comprises randomly distributing the interfered terminal suffering from interference around a hotspot region that is disposed within a radius of a cell of an interfered link base station, the hotspot region having an area that is smaller than the area of the cell.

2. The method of claim 1, wherein the distributing of the interfering terminals and the interfering link base station comprises randomly distributing a predetermined number of interfering terminals around the interfered terminal within a radius of a hot-spot cell, and distributing the interfering link base station according to a condition of an input parameter.

3. The method of claim 1, wherein the calculating of the path loss and the collision factor between the interfered terminal and the interfering terminal comprises calculating the collision factor using the following equation:

$$G_{collision} = 10\log_{10}\left(\frac{T_{collision}}{T_{vic}}\right)$$

where $T_{vic}$ denotes a packet period of the interfered terminal, $T_{inter}$ denotes a packet period of the interfering terminal, and $T_{collision}$ denotes a time when a packet of the interfered terminal collides with a packet of the interfering terminal.

4. The method of claim 1, wherein the calculating of the final signal-to-interference power ratio and the data throughput of the interfered terminal comprises calculating the signal-to-interference power ratio using the following equation:

$$\frac{G}{I} = \frac{P_{r\_user}}{N_0 + I_{inter} + I_{other}}$$

where $P_{r\_user}$ denotes a size of a signal that the interfered terminal receives from the base station, $N_0$ denotes thermal noise of the terminal, $I_{inter}$ denotes a size of an interference signal by the same sub-band user in an adjacent cell, and $I_{other}$ denotes a size of an interference signal received from the other system.

5. The method of claim 4, wherein the interference signal sizes $I_{inter}$ and $I_{other}$ are calculated using a value obtained by subtracting the collision factor from a path loss difference between the terminals.

6. The method of claim 4, wherein $I_{other}$ is calculated using the following equation:

$$I_{other} = P_{tx}(f_{interfer}, f_{vr}) - PL_{t\_t} - G_{collision}$$

where $P_{tx}(f_{interfer}, f_{vr})$ denotes a size of a signal actually transmitted in a receiving bandwidth of the interfered terminal in a mask of a transmitting signal that the interfering terminal transmits after performing power control, $PL_{t\_t}$ denotes the path loss value calculated in a unit configured to calculate a path loss between the interfered terminal and the interfering terminal, and $G_{collision}$ denotes the collision factor between the interfered terminal and the interfering terminal calculated in a unit configured to calculate a collision factor between the interfered terminal and the interfering terminal.

* * * * *